US 012284643B2

(12) United States Patent
Atake et al.

(10) Patent No.: US 12,284,643 B2
(45) Date of Patent: Apr. 22, 2025

(54) IN-VEHICLE TERMINAL, DATA COLLECTION SYSTEM, AND DATA TRANSMISSION SYSTEM

(71) Applicant: DENSO CORPORATION, Kariya (JP)

(72) Inventors: Yoshinori Atake, Kariya (JP); Kousuke Yamaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 412 days.

(21) Appl. No.: 17/180,898

(22) Filed: Feb. 22, 2021

(65) Prior Publication Data

US 2021/0274517 A1 Sep. 2, 2021

(30) Foreign Application Priority Data

Feb. 28, 2020 (JP) .................. 2020-032891

(51) Int. Cl.
*H04W 72/12* (2023.01)
*H04W 72/02* (2009.01)
*H04W 72/566* (2023.01)

(52) U.S. Cl.
CPC ....... *H04W 72/1221* (2013.01); *H04W 72/02* (2013.01); *H04W 72/569* (2023.01); *H04W 72/566* (2023.01)

(58) Field of Classification Search
CPC ............. H04W 72/1221; H04W 72/02; H04W 72/569; H04W 72/566; H04W 28/0263; H04L 47/2433
See application file for complete search history.

(56) References Cited

U.S. PATENT DOCUMENTS

| 6,816,458 B1* | 11/2004 | Kroon | H04L 69/163 |
| | | | 370/395.42 |
| 2003/0022682 A1 | 1/2003 | Weston et al. | |
| 2005/0135242 A1* | 6/2005 | Larsen | H04W 40/02 |
| | | | 370/229 |
| 2012/0106447 A1* | 5/2012 | Yousefi | H04N 19/102 |
| | | | 370/328 |

(Continued)

FOREIGN PATENT DOCUMENTS

| JP | H11-008663 A | 1/1999 |
| JP | 2018-073389 A | 5/2018 |

(Continued)

*Primary Examiner* — Ivan O Latorre
(74) *Attorney, Agent, or Firm* — Harness, Dickey & Pierce, P.L.C.

(57) ABSTRACT

An in-vehicle terminal includes: a communication unit; a necessity determination unit; a basic life determination unit that determines a life of data; a life correction unit that corrects the basic life determined by the basic life determination unit according to factors presumed to affect data fluctuations/data change; and a transmission determination unit that determines a transmission order of the data by the data transmission unit based on (i) the transmission necessity of the data determined by the necessity determination unit and (ii) a post-correction life corrected by the life correction unit, in a manner that (a) data having the higher transmission necessity and/or the shorter post-correction life has an earlier transmission order while (b) data having the lower transmission necessity and/or the longer post-correction life has a later transmission order.

7 Claims, 6 Drawing Sheets

(56) References Cited

U.S. PATENT DOCUMENTS

| | | | |
|---|---|---|---|
| 2012/0275383 | A1 | 11/2012 | Matsukawa |
| 2015/0302343 | A1* | 10/2015 | Anjum ............ G06Q 10/063114 705/7.15 |
| 2018/0113892 | A1 | 4/2018 | Nakata et al. |
| 2018/0295634 | A1 | 10/2018 | Nagura et al. |
| 2019/0066403 | A1 | 2/2019 | Nagura et al. |
| 2019/0253948 | A1 | 8/2019 | Nagura et al. |
| 2019/0394626 | A1 | 12/2019 | Hitotsumatsu et al. |
| 2020/0053015 | A1* | 2/2020 | Chung ................ H04L 47/6275 |
| 2020/0229209 | A1* | 7/2020 | Sorrentino .......... H04W 72/569 |

FOREIGN PATENT DOCUMENTS

| | | |
|---|---|---|
| JP | 2018-182430 A | 11/2018 |
| JP | 2019-040305 A | 3/2019 |
| JP | 2019-056559 A | 4/2019 |
| JP | 2019-140563 A | 8/2019 |
| JP | 2019-203823 A | 11/2019 |
| JP | 2020-003934 A | 1/2020 |
| WO | WO-11/083570 A1 | 7/2011 |

* cited by examiner $$S > A > B > C$$

$$B > C > A > S$$

IN-VEHICLE TERMINAL, DATA COLLECTION SYSTEM, AND DATA TRANSMISSION SYSTEM

CROSS REFERENCE TO RELATED APPLICATION

The present application is based on and claims the benefit of priority of Japanese Patent Application No. 2020-032891, filed on Feb. 28, 2020, the disclosure of which is incorporated herein by reference.

TECHNICAL FIELD

The present disclosure generally relates to an in-vehicle terminal, a data collection system, and a data transmission method.

BACKGROUND INFORMATION

There is known a technique for transmitting data acquired from a vehicle to the outside of a vehicle such as to a server.

SUMMARY

It is an object of the present disclosure to provide an in-vehicle terminal, a data collection system, and a data transmission method that enable transmission of data in a transmission order that is more suited for a fluctuating data value of transmission data, which may change time to time.

The above object is achieved by a combination of features described in independent claims, and sub-claims define further advantageous embodiments of the disclosure. Here, the reference numerals in parentheses described in claims indicate correspondence to the concrete means described in the embodiments, which is an example of the present disclosure. Thus, the technical scope of the present disclosure is not necessarily limited thereto.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
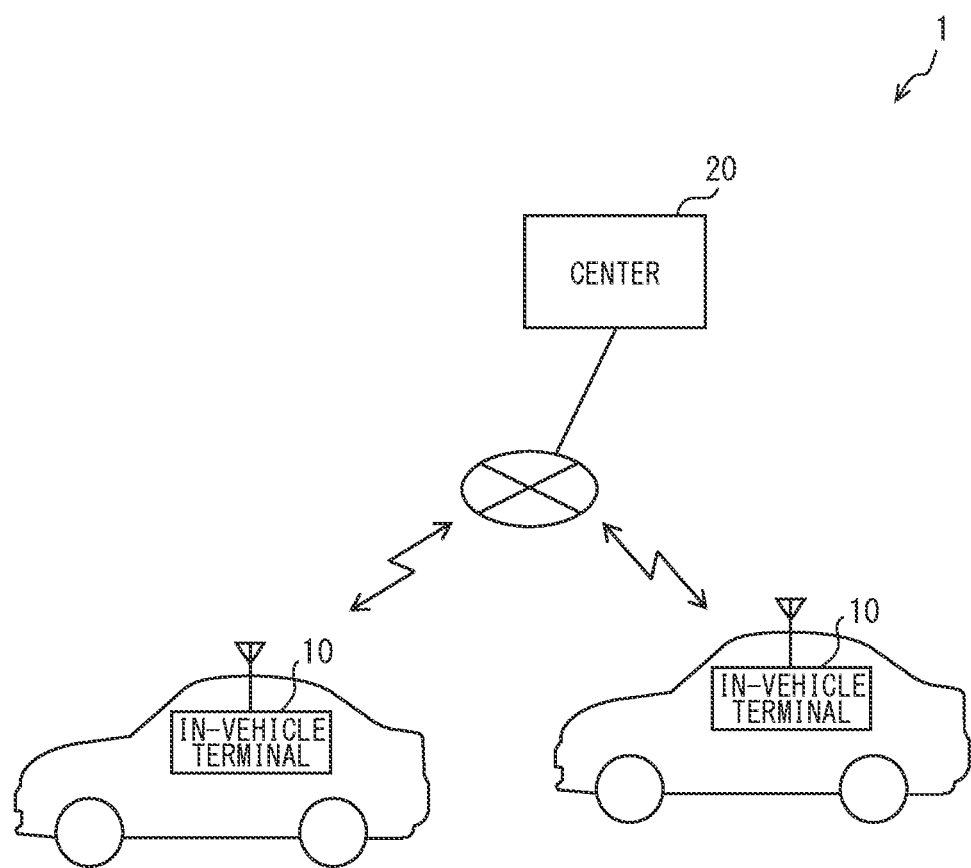
FIG. 1 is a diagram showing an example of a schematic configuration of a data collection system 1.

Multiple embodiments will be described for disclosure hereinafter with reference to the drawings. For convenience of description, the same reference numerals are assigned to part/components/configurations having the same functions as those illustrated in the drawings used in the preceding description among the plurality of embodiments, and the description of the same components/configurations may be not repeated. Description in another applicable embodiment may be referred to for such a part denoted by the identical reference sign.

First Embodiment

<Schematic Configuration of a Data Collection System 1>

The present embodiment will now be described with reference to the drawings. First, a data collection system 1 will be described with reference to FIG. 1. As shown in FIG. 1, the data collection system 1 includes an in-vehicle terminal 10 used in a vehicle and a center 20. The data collection system 1 may include one in-vehicle terminal 10 of one vehicle, or may multiple in-vehicle terminals 10 located respectively in multiple vehicles.

The in-vehicle terminal 10 communicates data with the center 20. The in-vehicle terminal 10 transmits the data acquired by a subject vehicle to the center 20. The vehicle referred to here may be, for example, an automobile. Details of the in-vehicle terminal 10 will be described later.

The center 20 may be, for example, a server. The center 20 may be, for example, a server on the so-called cloud. The center 20 receives the data transmitted from the in-vehicle terminal 10. The center 20 stores the data received from the in-vehicle terminal 10 in a storage device, and may transfer the received data to another center that uses the data.

The center 20 may transmit information about the data to be collected from the in-vehicle terminal 10 (hereinafter, collection needs) to the in-vehicle terminal 10. For example, the collection needs may be a type or types of required data, an acquisition position (i.e., where the data is acquired), and the like. The center 20 may be composed of one server or multiple servers, i.e., server computers.

<Schematic Configuration of the in-Vehicle Terminal 10>

Figure 2:
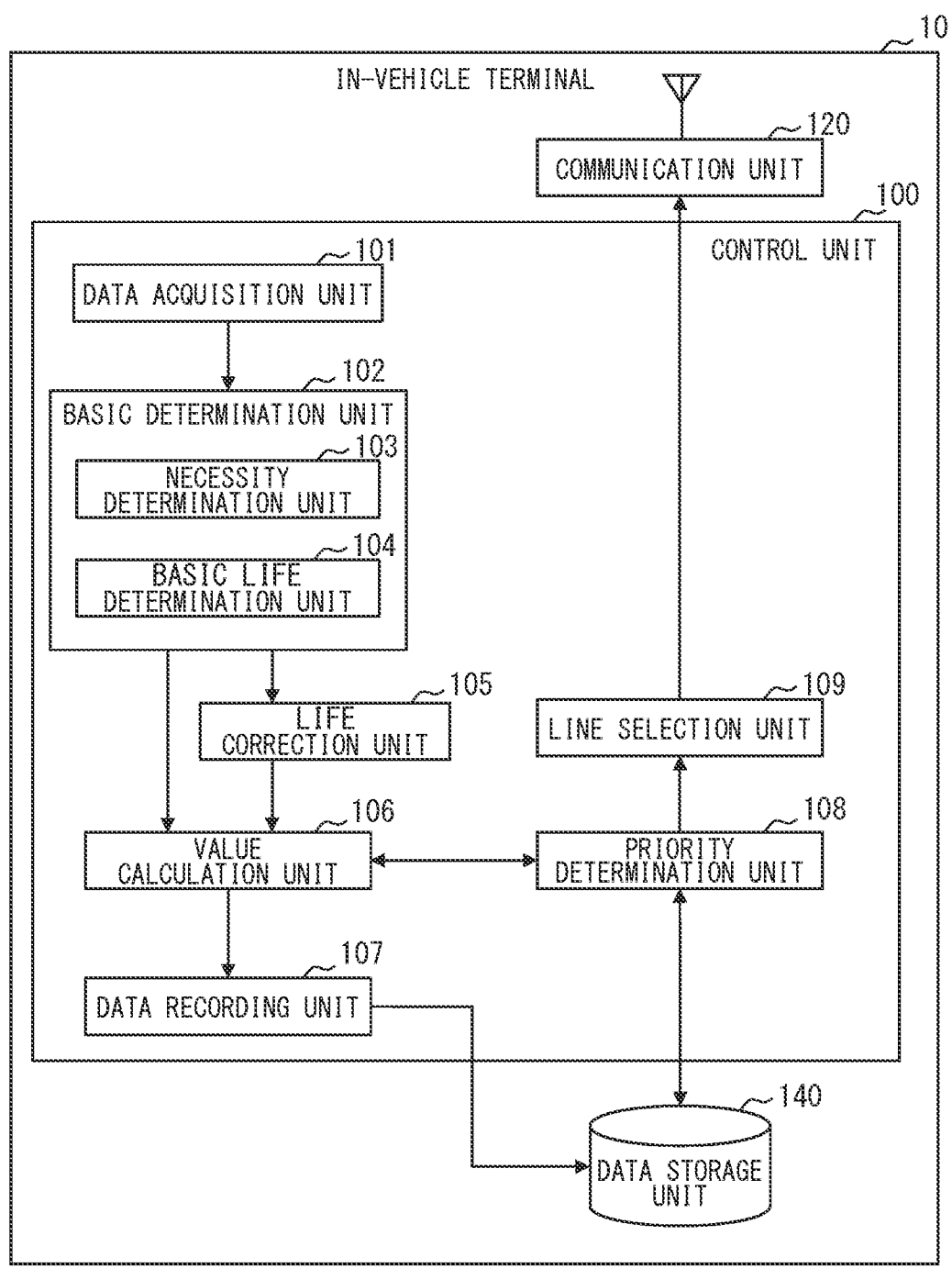
FIG. 2 is a diagram showing an example of a schematic configuration of an in-vehicle terminal.

Subsequently, a schematic configuration of the in-vehicle terminal 10 will be described with reference to FIG. 2. As shown in FIG. 2, the in-vehicle terminal 10 includes a control unit 100, a communication unit 120, and a data storage unit 140.

The communication unit 120 transmits and receives signals by radio waves. The communication unit 120 communicates with the center 20 via a public communication network, a base station, or the like. For example, the communication unit 120 may be configured to communicate with the center 20 by properly using a plurality of types of communication lines having respectively different communication costs. The plurality of types of communication lines that can be used by the communication unit 120 may be three or more types. In the following, the case where the communication unit 120 can use two types of a communication line having a higher communication cost and a communication line having a lower communication cost will be described as an example. As an example, the communication line having a higher communication cost may be a cellular line such as LTE (Long Term Evolution). On the other hand, the communication method having a lower communication cost may be Wi-Fi (registered trademark). The communication unit 120 transmits the data acquired by the subject vehicle to the center 20. Therefore, the communication unit 120 corresponds to a data transmission unit in claims. The communication unit 120 receives the collection needs transmitted from the center 20.

The data storage unit 140 stores data and the like transmitted by the communication unit 120. A memory may be used as the data storage unit 140. The data storage unit 140 may be a non-volatile memory or a volatile memory.

The control unit 100 includes, for example, a processor, a memory, an I/O, and a bus connecting these, and executes various processes related to transmission of data acquired by the subject vehicle by executing a control program stored in the memory. The memory mentioned in the above is a non-transitory, tangible storage medium that stores non-transitory computer-readable programs and data. The non-transitory, tangible storage medium is implemented by a semiconductor memory or the like. Details of the control unit 100 will be described below.

<Schematic Configuration of the Control Unit 100>

Subsequently, a schematic configuration of the control unit 100 will be described with reference to FIG. 2. As shown in FIG. 2, the control unit 100 includes a data acquisition unit 101, a basic determination unit 102, a life correction unit 105, a value calculation unit 106, a data recording unit 107, a priority determination unit 108, and a line selection unit 109, respectively provided as a function block. A part or all of the functions executed by the control unit 100 may be configured as hardware by one or more ICs or the like. Further, a part or all of the function blocks included in the control unit 100 may be realized/provided by a combination of (i) executing software by a processor and (ii) hardware members.

In FIG. 2, the controller 100 is also known as the controller. The data acquisition unit 101 is also known as the data acquirer. The basic determination unit 102 is also known as the basic determiner. The necessity determination unit 103 is also known as the necessity determiner. The basic life determination unit 104 is also known as the basic life determiner. The life correction unit 104 is also known as life corrector. The value calculation unit 106 is also known as the value calculator. The data recording unit 107 is also known as the data recorder. The priority determination unit 108 is also known as the transmission determination unit, or the priority determiner, or the transmission determiner. The line selector unit 109 is also known as the line selector. The communication unit 120 is also known as the data transmission unit, or the communicator, or the data transmitter. The data storage unit 140 is also known as the data storer.

The data acquisition unit 101 acquires the data acquired by the subject vehicle. The data acquisition unit 101 acquires the data to be transmitted from the subject vehicle to the center 20 among the data acquired by the subject vehicle. The data to be transmitted from the subject vehicle to the center 20 indicates that it is a candidate data for transmission, and it is possible that such data may consequently be not transmitted. Examples of the data acquired by the data acquisition unit 101 include emergency call data, obstacle detection data, vehicle (i.e., subject vehicle) behavior data, captured image data, and the like. It should be noted that the above description is merely an example, and the data acquisition unit 101 may be configured to acquire other data other than the above.

The data of an emergency call (hereinafter referred to as emergency call data) may be, for example, emergency call data generated by an emergency call system. The emergency call system may be configured to automatically generate emergency call data when an airbag is deployed. Further, the emergency call system may be configured to generate emergency call data by an input operation of a vehicle occupant. The occupant's input operation shall be performed, for example, when a passenger/co-occupant is suddenly ill. The emergency call data may be generated when a DSM (Driver Status Monitor) mounted on the subject vehicle detects an inoperable state of a driver of the subject vehicle.

The data involving obstacle detection (hereinafter referred to as obstacle detection data) may be the data of an obstacle detection result generated when an obstacle around the vehicle is detected by a peripheral monitoring sensor mounted on the vehicle. Obstacles may preferably be detected with distinction among/between pedestrians, surrounding vehicles, road obstacles, and the like. Further, it may be more preferable to detect the fallen object on the road with distinction between: objects on the road, road signs/signals, road structures and the like. When the peripheral monitoring sensor is a camera, these distinctions may be made by image recognition. When the peripheral monitoring sensor is a distance measuring sensor such as a millimeter wave radar, these distinctions may be made according to the shape, size, etc. of the obstacle indicated by a distance measurement point.

The behavior data of the subject vehicle (hereinafter referred to as subject vehicle behavior data) may be data of the detection result of the subject vehicle generated when the behavior of the subject vehicle is detected by the sensor mounted on the subject vehicle. Examples of the subject vehicle behavior data may include a vehicle speed of the subject vehicle detected by a vehicle speed sensor, an acceleration of the subject vehicle detected by an acceleration sensor, and a yaw rate of the subject vehicle detected by a gyro sensor.

The data of a captured image (hereinafter referred to as captured image data) may be captured image data generated when a periphery/surrounding of the subject vehicle is imaged by a camera among the peripheral monitoring sensors mounted on the subject vehicle. The imaging direction of the camera is not limited to a front of the subject vehicle, but the description will be continued hereafter assuming that the captured image is a front image (e.g., an image of a front field) of the subject vehicle. For example, the captured image data acquired by the data acquisition unit 101 may be captured image data that meets the collection needs received from the center 20. Hereinafter, the case where the captured image data acquired by the data acquisition unit 101 is the captured image data that meets the collection needs received from the center 20 will be described as an example.

In addition to the data itself, the data acquisition unit 101 also acquires accompanying information of such data, which is associated with the data itself at the time of data generation, hereafter designated as generation time information. The generation time information may be, for example, a data type, a data generation time, a data generation position, a data transmission destination, and the like. The data type is information indicating a type of data. The data generation time is information indicating the time when the data was generated. The data generation position is information indicating a position on a map where the data is generated. The data generation position may be configured to be specified based on the position of the subject vehicle, which is sequentially positioned by a locator mounted on the subject vehicle. The data transmission destination is information indicating a destination of data transmission.

The basic determination unit 102 determines a basic value for calculating a data value V described later. The basic determination unit 102 includes a necessity determination unit 103 and a basic life determination unit 104 respectively as sub-function blocks.

The necessity determination unit 103 determines a transmission necessity degree Tr, which is a degree of necessity of data transmission, based on the information at the time of generation (i.e., generation time information) of the data acquired by the data acquisition unit 101. The necessity determination unit 103 determines the transmission necessity degree Tr as a higher value for the data that has higher necessity of transmission. The necessity determination unit 103 may determine the transmission necessity degree Tr according at least to the data type of the generation time information from among the other attributes of the generation time information. As an example, the necessity determination unit 103 determines the transmission necessity degree Tr according to the data type acquired by the data acquisition unit 101 with reference to a correspondence between the data type and the transmission necessity degree Tr, which is stored in advance in the memory of the control unit 100. The processing step performed by the necessity determination unit 103 corresponds to a necessity determination process in claims.

For example, the transmission necessity degree Tr may be determined depending on which of the following categories S, A, B, and C the data type corresponds/belongs to. Category S is a data type related to the safety of the driver or passenger of the subject vehicle. Examples of the data of the data type corresponding to the category S include the above-mentioned emergency call data. Category A is a data type related to the safety of vehicles or passersby around the subject vehicle. Examples of the data of the data type corresponding to the category A include the above-mentioned obstacle detection data. Category B is a data type collected for machine learning and a data type collected for map generation. Examples of the data of the data type corresponding to the category B include the above-mentioned captured image data. An example of using captured image data for machine learning is the use for training of detection algorithms. Examples of using the captured image data for map generation include use for street view and use for SLAM (Simultaneous Localization and Mapping). Category C is a data type with high real-timeness. Examples of the data of the data type corresponding to the category C include the above-mentioned subject vehicle behavior data. It is assumed that the categories S and A are respectively a category that are highly related to safety, and the categories B and C are respectively a category that are not highly related to safety.

The necessity determination unit 103 may preferably determine/set the transmission necessity degree Tr of the data of the data type that is classified into the category highly related to safety as a higher value than the one (i.e., the transmission necessity degree Tr) of the data of the data type that is classified into the category not highly related to safety. That is, it may be preferable to determine the transmission necessity degree Tr of the data corresponding to the categories S and A higher than the transmission necessity degree Tr of the data corresponding to the categories B and C. According to such scheme, it becomes easy to transmit the data of the data type classified into the category having a high safety relation in preference to the data of the data type classified into the category not having a high safety relation. As a result, it becomes easier to improve traffic safety.

Figures 3, 4, 5:
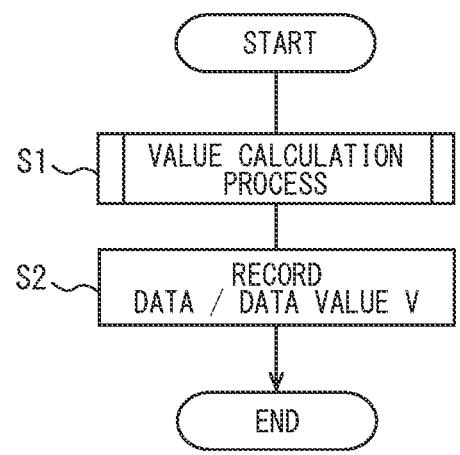
FIG. 3 is a diagram for explaining an example of a transmission necessity degree Tr of data according to data types.
FIG. 4 is a diagram for explaining an example of a length of a basic life Lb of data according to the data types.
FIG. 5 is a flowchart showing an example of a flow of data acquisition-related processing in the in-vehicle terminal.

For example, as shown in FIG. 3, the necessity determination unit 103 may determine the transmission necessity degree Tr so that the transmission necessity degree Tr decreases in the order of category S>category A>category B>category C. It is considered that the possibility that the emergency call data of category S is related to (i.e., involves) safety is higher than the possibility that the obstacle detection data of category A is related to (i.e., involves) safety, and thus it is considered that transmission necessity of the emergency call data of category S is higher than transmission necessity of the obstacle detection data of category A. Further, since the captured image data of category B meets the collection needs, it is considered that the transmission necessity of the captured image data of category B is higher than the transmission necessity of the subject vehicle behavior data of category C. The necessity determination unit 103 may be configured to determine the transmission necessity degree Tr according to the data types more subdivided than the ones described above.

Note that the configuration of the necessity determination unit 103 is not limited to the above-mentioned configuration that determines the transmission necessity degree Tr according to the data type. For example, the necessity determination unit 103 may be configured to determine the transmission necessity degree Tr according to a data position. In such case, the higher the average traffic flow rate of the vehicle a data position of certain data represents, the lower the transmission necessity degree Tr may be determined. This is because the densely vehicle-populated areas have more opportunities to collect data than the sparsely vehicle-populated areas, so the need for data transmission is considered to be low at such area. The average traffic flow rate of the vehicle may be estimated from the number of surrounding vehicles in the obstacle detection data, or may be acquired from the outside of the subject vehicle such as the center 20 or the like. For example, the average traffic flow rate of the vehicle may be estimated from traffic congestion information or the like acquired from the outside of the subject vehicle. The average traffic flow rate may be the average traffic flow rate per unit time for each link (i.e., a link of the map data), or may be the average traffic flow rate per unit time for each point/node.

In addition, the necessity determination unit 103 may be configured to determine the transmission necessity degree Tr according to the data generation time. In such case, the transmission necessity degree Tr may be determined lower when the data generation time corresponds to (i.e., is included in) the time zone when the average traffic flow rate of the vehicle is higher. This is because there are more opportunities to collect data during/in the time zone of higher vehicle traffic flow, and it is considered that the need for data transmission decreases for such data generation time. Note that the necessity determination unit 103 may be configured to determine the transmission necessity degree Tr by combining a plurality of conditions such as a data type, a data position, and a data generation time.

The basic life determination unit 104 determines a basic life Lb as the life of the data (i.e., when the data expires, or as the validity term specified as certain date/time, e.g., a date after which or a time after which the relevant data will no longer be used) based on the generation time information of the data acquired by the data acquisition unit 101. The basic life determination unit 104 determines a shorter basic life Lb as the required real-timeness of the data is higher. The basic life determination unit 104 may determine the basic life Lb according to the data type of the generation time information from among the other attributes of the generation time information. For example, the basic life determination unit 104 may determine the basic life Lb depending on which of the above-mentioned S, A, B, and C a category of the data type of the relevant data corresponds to. As an example, the basic life determination unit 104 may determine the life Lb from the data type of the data acquired by the data acquisition unit 101, with reference to the correspondence between the data type stored in the memory of the control unit 100 in advance and the basic life Lb. The processing performed by the basic life determination unit 104 corresponds to a basic life determination process in claims.

For example, as shown in FIG. 4, the basic life determination unit 104 may determine the basic life Lb so that the basic life Lb decreases in the order of category B>category C>category A>category S. This is because it is considered that the data type of the data classified into the category that is highly related to safety is required to have higher real-timeness than the data type of the data classified into the category that is not highly related to safety. Further, the reason why the data of the category S is determined to have a shorter basic life Lb than that of the data of the category A is that the emergency call data of the category S may possibly be related more highly to the safety than the obstacle detection data of the category A, and it is considered that the real-timeness required for the emergency call data of the category S is higher than the real-timeness required for the obstacle detection data of the category A. The reason why the basic life Lb of the captured image data of the category B is the longest is that it is unlikely for the captured image data to be related to the safety and it is considered that the real-timeness required for such data is lower than that of the subject vehicle behavior data of the category C.

The basic life determination unit 104 may be configured to determine the basic life Lb according to the data type more subdivided than described above. For example, even if the data falls into the same obstacle detection data category, the basic life Lb of the data of the road sign that is unlikely to change may be determined longer than the same of the data of the fallen object on the road that may easily change.

As described above, the highness of the transmission necessity degree Tr for different data types (i.e., the relationship between data types and set degrees Tr) and the length of the basic life Lb for different data types (i.e., the relationship between a period/term up to the life and set degrees Tr) have respectively different trends. Specifically, the data type of the data having a higher transmission necessity degree Tr is not necessarily determined to have a shorter basic life Lb. When one transmission necessity degree Tr is determined higher than the other among certain data types, the basic life Lb for such data type may also be determined longer than the other data type(s).

The life correction unit 105 corrects the basic life Lb determined by the basic life determination unit 104 according to a factor presumed to affect the change/fluctuation of data (hereinafter, influence factor). The corrected life may hereinafter be referred to as a post-correction life Lc. Examples of influence factors include an elapsed time since the data was acquired by the subject vehicle, an average traffic flow rate at a position where the data was acquired by the subject vehicle, and the like. The processing step performed by the life correction unit 105 corresponds to the life correction process in claims. The elapsed time since the data was acquired by the subject vehicle can be rephrased as an elapsed time since the data was generated by the subject vehicle.

It may be preferable that the life correction unit 105 corrects the basic life Lb determined by the basic life determination unit 104 to be shorter (e.g., earlier date) as the elapsed time becomes longer. For example, assuming that the current elapsed time from the data generation time is T, the post-correction life Lc may be calculated by an equation: a post-correction life Lc=a basic life Lb−an elapsed time T. The data generation time, among other data attributes of the data involving the generation time information acquired by the data acquisition unit 101, may be used as the data generation time. The elapsed time T may be calculated by subtracting the data generation time from the current time. According to the above configuration, it is possible to correct the life of the data according to the passage of time.

It may be preferable that the life correction unit 105 corrects, i.e., shorten the period of, the basic life Lb determined by the basic life determination unit 104 as the average traffic flow rate at the position where the data is acquired by the subject vehicle increases. For example, when F is a coefficient that increases as the average traffic flow rate increases, the post-correction life Lc may be calculated by an equation: a post-correction life Lc=a basic life Lb/a coefficient F. That is, the life of the data may be corrected to a value acquired/calculated by dividing the basic life Lb by the coefficient F.

The coefficient F may be specified from the average traffic flow rate at the position where the data is acquired by the subject vehicle, for example, by referring to the correspondence between the average traffic flow rate and the coefficient F stored in the memory of the control unit 100 in advance. The average traffic flow rate may be configured as required by the control unit 100 in the same manner as described above. The configuration in which the coefficient F is specified based on the average traffic flow rate is not limited to the one described above, but the configuration may also be the one in which the coefficient F is specified from the information with which the average traffic flow rate is estimable. The information which enables estimation of the average traffic flow rate includes data generation time, data generation position, and the like. For example, when the data generation time is used for such estimation, the coefficient F may be specified as a greater value in a time zone where the average traffic flow rate is estimated to be greater. Further, when the data generation position is used for such estimation, the coefficient F may be specified as a greater value as the average traffic flow rate is estimated to be greater.

The data acquired at a position with a high average traffic flow rate may be more likely to fluctuate/change. For example, it is considered that the obstacle detection data is more likely to fluctuate at a position where the average traffic flow rate is higher. For example, it is considered that the higher the average traffic flow rate, the easier/more likely it is for the traffic sign and the fallen object on the road to change their positions in contact with the running vehicle, and the easier it is for the fallen object on the road to be found and removed from the road. Data that deviates from the reality/actual situation due to the change/fluctuation has reduced needs for transmission. On the other hand, according to the above configuration, the correction of the data life from the basic life Lb, which makes the data life shorter, is performed as the average traffic flow rate at the position where the data is acquired by the subject vehicle increases. Therefore, it is possible to correct the life of the data according to the fact that the data is likely to change/fluctuate according to the environment that is presumed to affect the change/fluctuation of the data.

The life correction unit 105 may preferably correct the life Lb to have a shorter length depending on or according to the data type, i.e., the amount of shortening of the life made smaller for a data type of the data whose change is estimable as being less affected by the average traffic flow rate. For example, for data types that are estimated to be less affected by the average traffic flow, no correction is performed according to the average traffic flow rate, and for data types that are estimated to be greatly affected by the average traffic flow, correction of data life is performed according to the average traffic flow rate. According to the above correction scheme, it is enabled to implement a more "fine-tuned" correction scheme of the data life according to the "estimation" of the effect of the data fluctuation, or according to an environment "estimable" as being more influential to the change of the data.

The life correction unit 105 may be configured to correct the basic life Lb according to the elapsed time since the data was acquired by the subject vehicle and the average traffic flow rate at the position where the data was acquired by the subject vehicle. In such case, for example, the post-correction life Lc may be calculated by an equation: (basic life Lb−elapsed time T)/coefficient F.

The value calculation unit 106 calculates the data value V at the current time from the transmission necessity degree Tr determined by the necessity determination unit 103 and the post-correction life Lc corrected by the life correction unit 105. As an example, the data value V at the current time may be calculated from the transmission necessity degree Tr, the basic life Lb, and the post-correction life Lc by a function for calculating the data value V at the current time. To give a specific example, the data value V may be calculated by an equation: a data value V=a transmission necessity degree Tr×a basic life Lb/a post-correction life Lc. The function may be a linear function or a non-linear function. Further, the function may be different respective data types and the like. The function may be any function as long as it calculates a higher data value V according to (i) the higher transmission necessity degree Tr and (ii) the shorter post-correction life Lc, while calculating a lower data value V according to (iii) the lower transmission necessity degree Tr and (iv) the longer life Lc. Further, the function may satisfy/establish a relationship in which the data value V of 0 (zero) is defined when the post-correction life Lc becomes 0 (zero).

The data recording unit 107 associates the data acquired by the data acquisition unit 101 with the data value V calculated by the value calculation unit 106 with respect to the relevant data, and records the data in the data storage unit 140. When it is recorded in the data storage unit 140, it is recognized as data to be transmitted by the communication unit 120. The data recording unit 107 may record the data acquired by the data acquisition unit 101 in the data storage unit 140 by associating the generation time information with the data acquired by the data acquisition unit 101 so that the current data value V can be easily recalculated.

The priority determination unit 108 compares the data value V of the data recorded in the data storage unit 140, and determines a transmission order. The priority determination unit 108 corresponds to a transmission determiner in claims. The priority determination unit 108 may determine the data to be transmitted next time (i.e., data subject to the subsequent transmission operation) by determining the transmission order of each of the vehicle data recorded in the data storage unit 140. The priority determination unit 108 may determine the transmission order and may rearrange the data according to the determined transmission order. The priority determination unit 108 determines the transmission order in an order of early transmission for a higher data value V. In other words, the priority determination unit 108 determines the data transmission order as an earlier order according to the data attributes of the higher transmission necessity degree Tr and the shorter basic life Lb, while determining the data transmission order as a later order according to the data attributes of the lower transmission necessity degree Tr and the longer basic life Lb. The processing step performed by the priority determination unit 108 corresponds to a transmission determination process in claims. The priority determination unit 108 may be configured to determine the data transmission order for each of plural lines by using a function that calculates the data value V according to the characteristics of each of the plurality of lines, i.e., may calculate the transmission order of the data line by line.

The value calculation unit 106 calculates a higher data value V according to the fact that the transmission necessity degree Tr is higher and the post-correction life Lc is shorter. Therefore, although the basic life Lb and the post-correction life Lc tend to be shorter for the data types classified into the category highly related to safety, such data also simultaneously has a high transmission necessity degree Tr, which leads to an early transmission of the relevant data. Therefore, it is unlikely that a data type of the data classified into a category that is highly related to safety will less susceptible to a situation that life of such data expires before data transmission even though the basic life of such data is set as a short period in the first place.

The life correction unit 105 may have a configuration in which a predetermined value greater than 0 is set as a lower limit value of the post-correction life Lc for the data type in which the highness of the transmission necessity degree Tr is equal to or greater than a specified value. According to such scheme, for the data type in which the necessity of transmission is particularly high, it is possible to prevent the post-correction life Lc from becoming 0 for a more reliable transmission of the data.

The line selection unit 109 selects a line to be used for data transmission for target/relevant data to be transmitted. The line selection unit 109 may select a line to be used for data transmission of the target data, for example, based on the data value V recorded in the data storage unit 140. As an example, for data having a data value V equal to or higher than a threshold value, a cellular line with a high QoS and a wide communication area may be selected. On the other hand, for data whose data value V is less than the threshold value, a line such as Wi-Fi having a lower communication cost may be selected.

The communication unit 120 transmits the data having the first transmission order determined by the priority determination unit 108 on the line selected for such data by the line selection unit 109. The processing step performed by the communication unit 120 corresponds to a data transmission process in claims. For the data successfully transmitted by the communication unit 120, the data is deleted from the data storage unit 140. Further, the communication unit 120 does not transmit the data whose data value V is 0, that is, the data whose life is corrected from the basic life Lb to 0 by the life correction unit 105.

<Data Acquisition Related Processing>

Figure 6:
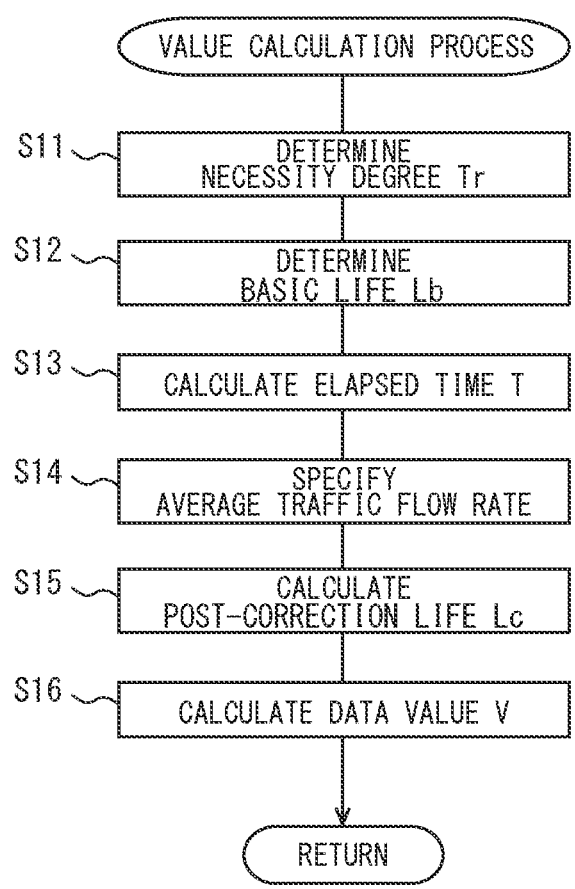
FIG. 6 is a flowchart showing an example of a flow of value calculation processing in the in-vehicle terminal.

Here, an example of a flow of processing related to data acquisition on the in-vehicle terminal 10 (hereinafter, data acquisition-related processing) will be described with reference to flowcharts of FIGS. 5 to 6. Here, a case where the correction of the basic life Lb of the data is corrected by using the elapsed time T and the average traffic flow rate will be described as an example. A flowchart of FIG. 5 may be configured to start every time the data acquisition unit 101 acquires data.

First, in step S1, a value calculation process is performed, and the process proceeds to step S2. In the value calculation process, the data value V of the data acquired by the data acquisition unit 101 is calculated. Here, an example of the flow of the value calculation process will be described with reference to a flowchart of FIG. 6.

In step S11, the necessity determination unit 103 determines the transmission necessity degree Tr based on the generation time information of the data acquired by the data acquisition unit 101. In step S12, the basic life determination unit 104 determines the basic life Lb of the data based on the generation time information of the data acquired by the data acquisition unit 101.

In step S13, the life correction unit 105 calculates the elapsed time T by subtracting the data generation time of the generation time information of the data acquired by the data acquisition unit 101 from the current time. In step S14, the life correction unit 105 specifies the average traffic flow rate at the position where the data was acquired.

In step S15, the life correction unit 105 calculates the post-correction life Lc acquired by correcting the basic life Lb according to the elapsed time T calculated in S13 and the average traffic flow rate specified in S14. In step S16, the value calculation unit 106 calculates the data value V at the current time from the transmission necessity degree Tr determined in S11 and the post-correction life Lc calculated in S15.

Returning to FIG. 5, in step S2, the data recording unit 107 associates the data acquired by the data acquisition unit 101 with the data value V calculated by the value calculation process of S1 for the recording of the data in the data storage unit 140, and ends the data acquisition related processing.

<Data Transmission Related Processing>

Figure 7:
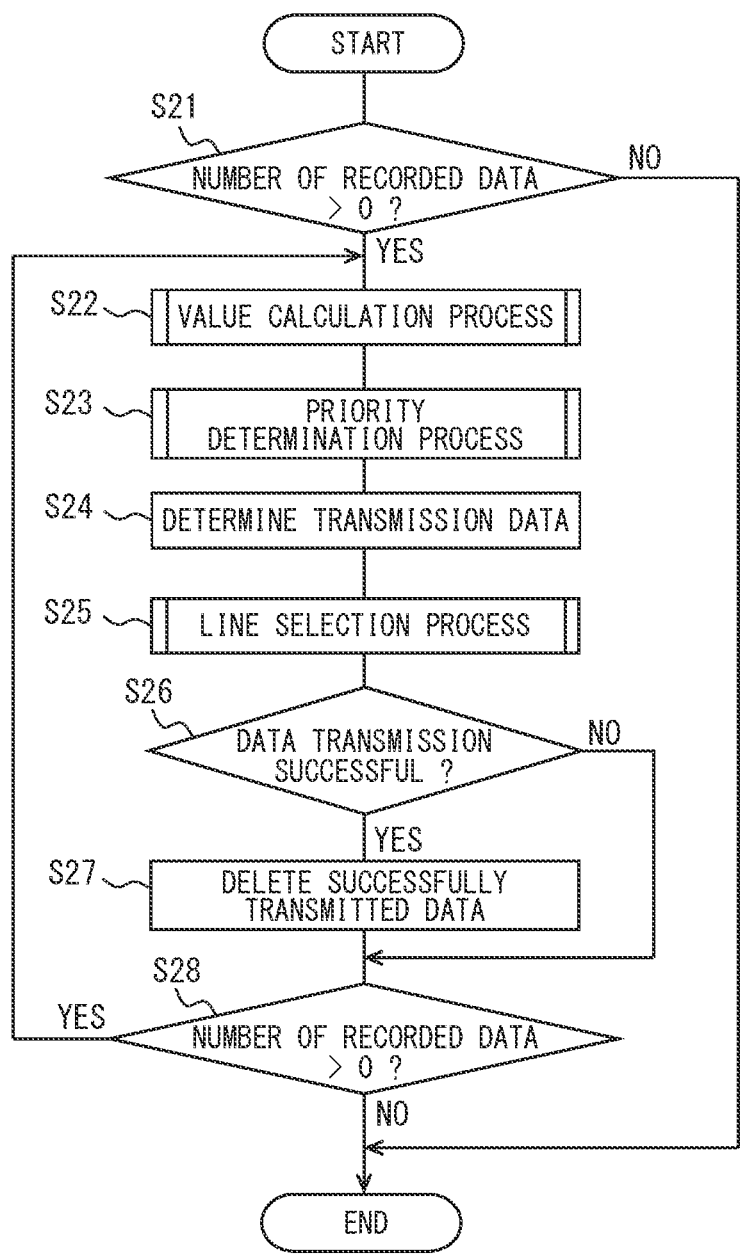
FIG. 7 is a flowchart showing an example of a flow of data transmission-related processing in the in-vehicle terminal.
Figure 8:
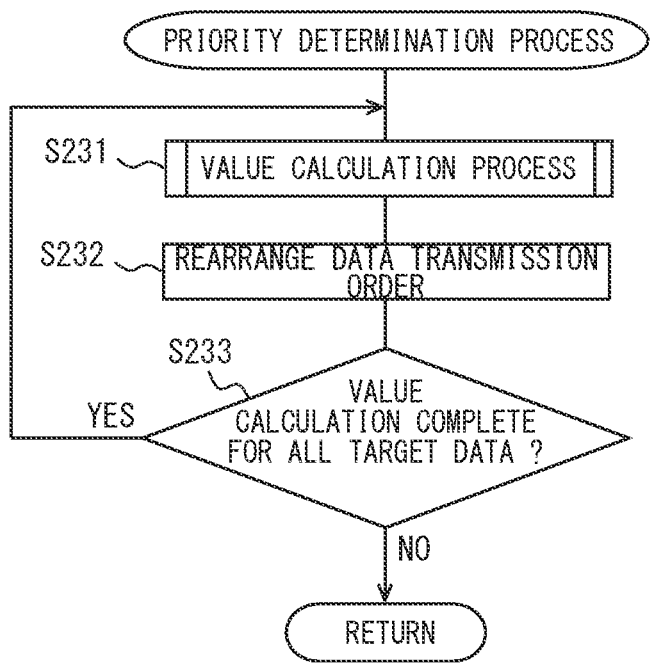
FIG. 8 is a flowchart showing an example of a flow of priority determination processing in the in-vehicle terminal.
Figure 9:
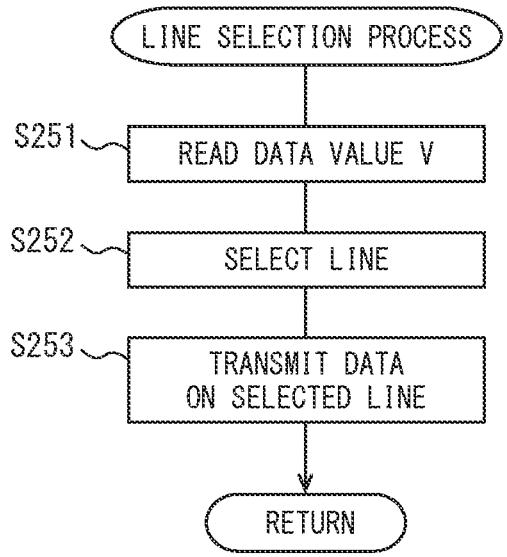
FIG. 9 is a flowchart showing an example of a flow of use line selection processing in the in-vehicle terminal.

Subsequently, an example of the flow of processing related to data transmission on the in-vehicle terminal 10 (hereinafter, data transmission-related processing) will be described with reference to flowcharts of FIGS. 7 to 9. Executing the steps included in the data transmission-related processing by the processor corresponds to performing the data transmission method in claims. A flowchart of FIG. 7 may be configured to start at a predetermined transmission cycle, for example. Note that the flowchart of FIG. 7 may be configured to start at different timings, such as a timing every time a data acquisition-related processing is performed.

First, in step S21, if the number of data recorded in the data storage unit 140 (hereinafter, the number of recorded data) is more than 0 (YES in S21), the process proceeds to step S22. On the other hand, when the number of recorded data is 0 (NO in S21), the data transmission related processing is terminated.

In step S22, the same value calculation process as in S1 is performed, and the data value V at the current time is calculated. In step S23, the priority determination unit 108 performs the priority determination process and the process proceeds to step S24. In the priority determination process, the data transmission order of the vehicle data recorded in the data storage unit 140 is determined. Here, an example of the flow of the priority determination process will be described with reference to a flowchart of FIG. 8.

In step S231, the same value calculation process as in S1 is performed, and the data value V at the current time is calculated. In step S232, the data transmission order is rearranged according to the data value V calculated in S231. In step S233, when the calculation of the data value V for all the target data is complete (YES in S233), the priority determination process ends. On the other hand, if there is still data for which the calculation of the data value V has not been complete (NO in S233), the process returns to S231 to calculate the data value V for the data for which the calculation of the data value V has not been completed, for repeating the flow.

It should be noted that, in the priority determination process, the data transmission order may be rearranged after completion of calculation of the data value V for all the target data. The data to be processed in the priority determination process may be all the data recorded in the data storage unit 140, or may be data having a data value V higher than a predetermined threshold value.

Returning to FIG. 7, in step S24, the priority determination unit 108 determines the data to be transmitted by the communication unit 120 (i.e., determines the transmission data). In step S25, the line selection process is performed, and the process proceeds to step S26. In the line selection process, the line to be used for data transmission is selected for the transmission data determined in S24, and the data is transmitted. Here, an example of the flow of the line selection process will be described with reference to a flowchart of FIG. 9.

In step S251, the line selection unit 109 reads the data value V from the data storage unit 140 with respect to the transmission data determined in S24. In step S252, the line selection unit 109 selects the line used for data transmission according to the data value V read in S251. In step S253, the communication unit 120 transmits the transmission data determined in S24 on the line selected in S252.

The communication unit 120 does not transmit the data whose data value V is 0. For the data whose data value V is 0, for example, the data recording unit 107 may delete the data from the data storage unit 140.

Returning to FIG. 7, in step S26, if the transmission of the transmission data is successful (YES in S26), the process proceeds to step S27. On the other hand, if the transmission of the transmission data fails (NO in S26), the process proceeds to step S28.

In step S27, for example, the data recording unit 107 deletes the data successfully transmitted in S26 from the data storage unit 140. In step S28, if the number of recorded data is more than 0 (YES in S28), the process returns to S22 and the process is repeated. On the other hand, when the number of recorded data is 0 (NO in S28), the data transmission-related processing is terminated.

<Summary of First Embodiment>

As the usage of terminals used in vehicles (that is, in-vehicle terminals) expands (i.e., is made more frequent), the amount of data communicated with the outside of the vehicle also increases. In addition, the types of data to be communicated will thus increase. Based on such background, issues that occur in in-vehicle terminals are assumed and set as follows.

First, there are problems of increased transmission data and increased communication costs. The increase in data sent and received from the in-vehicle terminals and the increase in vehicles using the in-vehicle terminals will increase the communication costs borne by vehicle manufacturers. Since the increased communication cost will be a burden on the vehicle manufacturer or the vehicle user, there is a demand to keep it low. Then, there is the problem of generating low-value data. For example, for data such as the existence of fallen objects on the road, the value of the data becomes approximately 0 after the fallen objects on the road are removed by a road maintenance worker or the like. It can be said that the priority of transmitting such low-value data at a communication cost is low. Furthermore, there is a problem of increased load on the communication line infrastructure. As the number of vehicles using the in-vehicle terminals increases, the load on infrastructure such as base stations increases. In such case, data transmission becomes impossible at the peak time of communication, or retransmission processing due to congestion or the like is likely to occur. This not only incurs extra communication costs, but may also require base station investment costs to resolve the situation. The configuration of the present embodiment focuses on the following in order to solve each of the above-mentioned problems.

There are various types of data transmitted from vehicles, and there are cases where multiple vehicles transmit equivalent data in duplicate. The required real-timeness or "freshness" may vary, from high to low. Data that show dynamic change has a life during which the data is valid/live and useful. Data that show dynamic change may end up in useless data. The lines and base stations used for data transmission have "idle time" during which only a few vehicles are performing communication therewith and/or "idle station" to which only a few vehicles are connected.

In the configuration of the present embodiment, in order to solve the problems of increased transmission data and increased communication cost, and the problem of increased load on the line infrastructure, the data transmission order and transmission timing are optimized for avoiding a situation where a large number/amount of data are transmitted at the same time. Further, a plurality of lines having different communication costs are switched according to the data value V. Furthermore, in order to solve the problem of low-value data generation, value is given according to the data type, data generation time, and data generation position. As a result, the value is corrected according to the elapsed time from the data generation and the average traffic flow rate, and the low-value data is rejected/discarded without being transmitted in the worst case.

According to the configuration of the present embodiment, the transmission order of data is determined in a manner that (i) data having higher transmission necessity degree and shorter post-correction life has the earlier transmission order, and, on the other hand, (ii) data having lower transmission necessity degree and longer post-correction life has the later transmission order. Since the degree of necessity of transmission is determined higher for the data that is highly required to be transmitted, it is considered that the data that needs to be transmitted is more valuable to be transmitted. Since the basic life of data is determined to be shorter as the required real-timeness/freshness is higher, it is considered necessary to transmit the data earlier as the basic life of the data is shorter. In addition, the corrected, or post-correction, life is a period/duration which is made by correcting the basic life according to the factors presumed to affect the fluctuation/change/variation of the data, which enables that the life of the relevant data is correctable according to the fluctuation/change/variation of the necessity of transmission of such data. Therefore, it enables early/earlier transmission of the data having a higher value and/or having higher transmission necessity, according to the "real-time/at-the-moment" fluctuation of the necessity of data transmission. As a result, it becomes possible to transmit data in a transmission order that is more suited for a fluctuating data value of the relevant data.

Second Embodiment

In the first embodiment, the in-vehicle terminal 10 is provided with the data storage unit 140, but the present invention is not limited to such configuration. For example, the data storage unit 140 may be provided outside the in-vehicle terminal 10.

Note that the present disclosure is not limited to the embodiments described above and can variously be modified within the scope of the disclosure. An embodiment acquired by appropriately combining the technical aspects disclosed in the different embodiments is also included in the technical scope of the present disclosure. The control unit and the method therefor which have been described in the present disclosure may be also realized by a dedicated computer which constitutes a processor programmed to execute one or more functions realized by computer programs. Also, the device and the method therefor which have been described in the present disclosure may be also realized by a special-purpose hardware logic circuit. Alternatively, the device and the method described in the present disclosure may be implemented by one or more special-purpose computers configured by a combination of a processor executing a computer program and one or more hardware logic circuits. The computer programs may be stored, as instructions to be executed by a computer, in a tangible, non-transitory computer-readable storage medium.

In FIG. 2, the control unit 100 is also known as the controller. The data acquisition unit 101 is also known as the data acquirer. The basic determination unit 102 is also known as the basic determiner. The necessity determination unit 103 is also known as the necessity determiner. The basic life determination unit 104 is also known as the basic life determiner. The life correction unit 104 is also known as life corrector. The value calculation unit 106 is also known as the value calculator. The data recording unit 107 is also known as the data recorder. The priority determination unit 108 is also known as the transmission determination unit, or the priority determiner, or the transmission determiner. The line selector unit 109 is also known as the line selector. The communication unit 120 is also known as the data transmission unit, or the communicator, or the data transmitter. The data storage unit 140 is also known as the data storer.

What is claimed is:

1. An in-vehicle terminal for use in a vehicle, the in-vehicle terminal comprising:
   a data transmitter configured to transmit data stored in a storage in the vehicle to a center located outside of the vehicle;
   a necessity determiner configured to determine a higher transmission necessity for the data having higher necessity of transmission;
   a basic life determiner configured to determine a life of data required to have higher real-timeness, or freshness, in a manner that the higher the required real-timeness is, the shorter a basic life becomes;
   a life corrector configured to perform, before the data is stored in the storage, correction of the basic life determined by the basic life determiner according to life factors that may affect data fluctuations or data change, based on a calculation of a data value (V) including a post-correction life (Lc); and
   a transmission determiner configured to determine, before the data transmitter transmits the data stored in the storage, a transmission order of the data by the data transmitter based on (i) the transmission necessity of the data determined by the necessity determiner and (ii) the Lc corrected by the life corrector, in a manner that (a) data having the higher transmission necessity and/or the shorter corrected life has an earlier transmission order while (b) data having the lower transmission necessity and/or the longer corrected life has a later transmission order;

wherein:

the transmission determiner is further configured to determine that the data is not transmitted when the data value (V) of the data re-calculated before transmission of the data stored in the storage unit includes the Lc of zero;

the data transmitter is configured to not transmit the data including the Lc of zero;

the necessity determiner, the basic life determiner, the life corrector, and the transmission determiner are implemented by a processor and memory;

the life factors at least include an average traffic flow rate at a position where the data is acquired by the vehicle; and the life corrector corrects the basic life determined by the basic life determiner to be shorter as the average traffic flow rate increases, such that the corrected life is generated.

2. The in-vehicle terminal of claim 1, wherein the life factors additionally include an elapsed time since the data was acquired by the vehicle.

3. The in-vehicle terminal of claim 1, wherein the life corrector corrects the basic life to be shorter depending on the data type in a manner where an amount of shortening of the life is made smaller for a data type of the data whose change is estimable as being less affected by the average traffic flow rate, such that the corrected life is generated.

4. The in-vehicle terminal of claim 1, wherein the necessity determiner determines the necessity of transmission based at least on the data type of the data in a manner where degree of necessity of the data classified into category highly related to safety has a higher value than degree of necessity of the data classified into category not highly related to safety.

5. The in-vehicle terminal of claim 1, wherein the data transmission unit does not transmit the data that is associated with the corrected life of zero.

6. A data collection system comprising:

(A) an in-vehicle terminal for use in a vehicle, the in-vehicle terminal including:

a data transmitter configured to transmit data stored in a storage in the vehicle to a center located outside of the vehicle;

a necessity determiner configured to determine a higher transmission necessity for the data having higher necessity of transmission;

a basic life determiner configured to determine a life of data required to have higher real-timeness, or freshness, in a manner that the higher the required real-timeness is, the shorter a basic life becomes;

a life corrector configured to perform, before the data is stored in the storage, correction of the basic life determined by the basic life determiner according to life factors that may affect data fluctuations or data change, based on a calculation of a data value (V) including a post-correction life (Lc); and a transmission determiner configured to determine, before the data transmitter transmits the data stored in the storage, a transmission order of the data by the data transmitter based on (i) the transmission necessity of the data determined by the necessity determiner and (ii) the Lc corrected by the life corrector, in a manner that (a) data having the higher transmission necessity and/or the shorter corrected life has an earlier transmission order while (b) data having the lower transmission necessity and/or the longer corrected life has a later transmission order; and (B) the center that receives data transmitted from the in-vehicle terminal; wherein:

the transmission determiner is further configured to determine that the data is not transmitted when the data value (V) of the data re-calculated before transmission of the data stored in the storage unit includes the Lc of zero;

the data transmitter is configured to not transmit the data including the Lc of zero;

the necessity determiner, the basic life determiner, the life corrector, and the transmission determiner are implemented by a processor and memory;

the life factors at least include an average traffic flow rate at a position where the data is acquired by the vehicle; and the life corrector corrects the basic life determined by the basic life determiner to be shorter as the average traffic flow rate increases, such that the corrected life is generated.

7. A data transmission method used in a vehicle, which transmits data stored in a storage in the vehicle by performing processes comprising:

a data transmission process that transmits the data stored in the storage in the vehicle to a center located outside of the vehicle;

a necessity determination process that determines a transmission necessity degree;

a basic life determination process that determines a basic life of data required to have higher real-timeness, or freshness, in a manner that the higher the required real-timeness is, the shorter the basic life becomes;

a life correction process that determines a corrected life that performs, before the data is stored in the storage, correction of the basic life process according to at least one factor, based on a calculation of a data value (V) including a post-correction life (Lc); and a transmission determination process that determines, before the data transmitter transmits the data stored in the storage, a transmission order of the data by the data transmission process based on (i) the transmission necessity degree of the data determined by the necessity determination process and (ii) the corrected life, in a manner that (a) a first data having the higher necessity degree and/or the shorter corrected life has a respectively earlier transmission order while (b) a second data having the lower transmission necessity degree and/or the longer corrected life has a respectively later transmission order;

wherein:

the transmission determination process determines that the data is not transmitted when the data value (V) of the data re-calculated before transmission of the data stored in the storage unit includes the Lc of zero;

the data transmission process does not transmit the data including the Lc of zero;

the at least one factor at least includes an average traffic flow rate at a position where the data is acquired by the vehicle; and the life correction process corrects the basic life determined by the basic life determination process to be shorter as the average traffic flow rate increases, such that the corrected life is generated.

* * * * *